Nov. 9, 1937.      C. E. FRUDDEN      2,098,492
PULLEY ATTACHMENT FOR TRACTORS
Original Filed June 13, 1935

Inventor
C. E. Frudden
by
Attorney

Patented Nov. 9, 1937

2,098,492

UNITED STATES PATENT OFFICE 2,098,492

PULLEY ATTACHMENT FOR TRACTORS

Conrad E. Frudden, Wauwatosa, Wis., assignor to Allis-Chalmers Manufacturing Company, Milwaukee, Wis., a corporation of Delaware Original application June 13, 1935, Serial No. 26,352. Divided and this application August 3, 1936, Serial No. 94,016

9 Claims. (Cl. 74—400)

The invention relates to pulley attachments for tractors, and it is concerned more specifically with attachments of this kind in which bevel gears are used for transmitting rotary movement from a power driven shaft to the pulley shaft. The present application is a division of application Serial No. 26,352, filed June 13, 1935, by Conrad E. Frudden and Walter F. Strehlow, for Motor vehicle.

Close tolerances, usually in the order of thousands of an inch, must be maintained in the mounting of bevel gears, if they are to operate at their best possible efficiency, as is well known. In power take-off attachments for tractors, using bevel gears, it has heretofore been a common practice to use shims in order to secure the bevel gears in their closely predetermined relative positions, but the use of shims was a handicap in providing a readily demountable belt pulley attachment and one in which the bevel gears were to be disengaged in order to disconnect the pulley shaft from the power shaft.

It is an object of the invention to do away with the use of shims where it is desired to adjust the depth of mesh of a pair of intermeshing bevel gears for best efficiency. According to the preferred manner of practicing the invention one of the intermeshing bevel gears is secured to a shaft which is journaled in axially fixed position in a sleeve, and in order to adjust the depth of mesh of the bevel gear on the shaft with its mating gear the sleeve is moved either forwardly or backwardly in the direction of its axis. There are an infinite number of axial positions of the sleeve which afford different depths of mesh of the bevel gears, and into which positions the sleeve may be moved by either forward or backward movement in the direction of its axis but the sleeve is not to be locked voluntarily in any one of all these possible axial positions. It is to be locked only in a definite number of predetermined axial positions which are spaced from one another an amount which is suitable in making adjustment of the depth of mesh of the bevel gears for best efficiency, and which amount in the case of small bevel gears, as in tractors, may be five thousandths of an inch in the direction of the sleeve axis. The locking of the sleeve in any one of such predetermined axial positions is accomplished according to the invention by means of a locking mechanism which may be tightened to hold the sleeve positively in any selected one of said positions against rotary as well as axial displacement and which, while being tightened, aids in locating the sleeve with great accuracy in the selected position. The individual axial positions of the sleeve differ from one another only a comparatively small amount, in the order of thousandths of an inch, as stated, and it is necessary to make sure that every time any one of these positions is selected the sleeve takes that position with the highest accuracy. For instance, if the sleeve is first locked in a certain position, then unlocked and moved to another position, and after that locked again in the position in which it was locked first, it should when locked in said first position for the second time occupy precisely the same position which it occupied when it was locked in that position the first time. It is, therefore, another object of the invention to provide a locking mechanism of the described character which does not lose its precision under the forces to which it is subjected during tightening and under the forces which are transmitted to the sleeve by the shaft which is journaled in the sleeve.

Another object of the invention is to provide a bevel gear driven belt pulley attachment for tractors, which may readily be mounted on and removed from a tractor and which after being mounted on the tractor may be positively locked thereon by tightening of a wedge connection, in any one of a predetermined number of axial positions, each of such axial positions affording a different depth of mesh of the bevel gears, and the construction being such that the depth of mesh of the bevel gears may be adjusted for best efficiency by trying several positions of the attachment.

Another object of the invention is to provide a bevel gear driven belt pulley attachment which may readily be secured on a tractor in several accurately predetermined positions in which the bevel gears are in mesh with each other, and in a position in which the bevel gears are out of mesh with each other.

Still another object of the invention is to provide a belt pulley attachment which is simple and compact in construction, efficient in operation, and which may be manufactured at low costs.

These and other objects and advantages of the invention will be apparent from the following description. A clear conception of an embodiment of the invention and of the operation of a device constructed in accordance therewith may be had by referring to the drawing accompanying and forming part of this specification.

Figure 2:
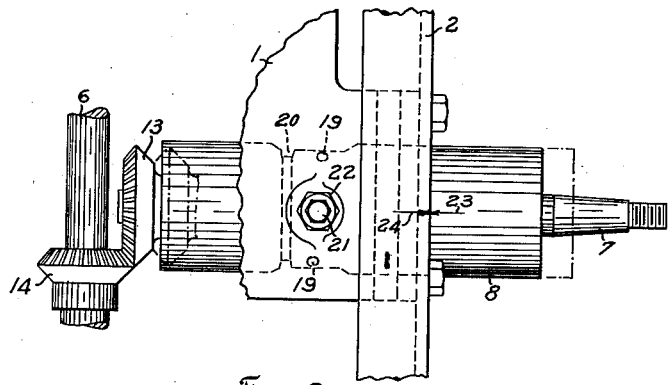
Figure 2 is a top view of the attachment, the belt pulley being omitted from the pulley shaft in this view.
Figure 1:
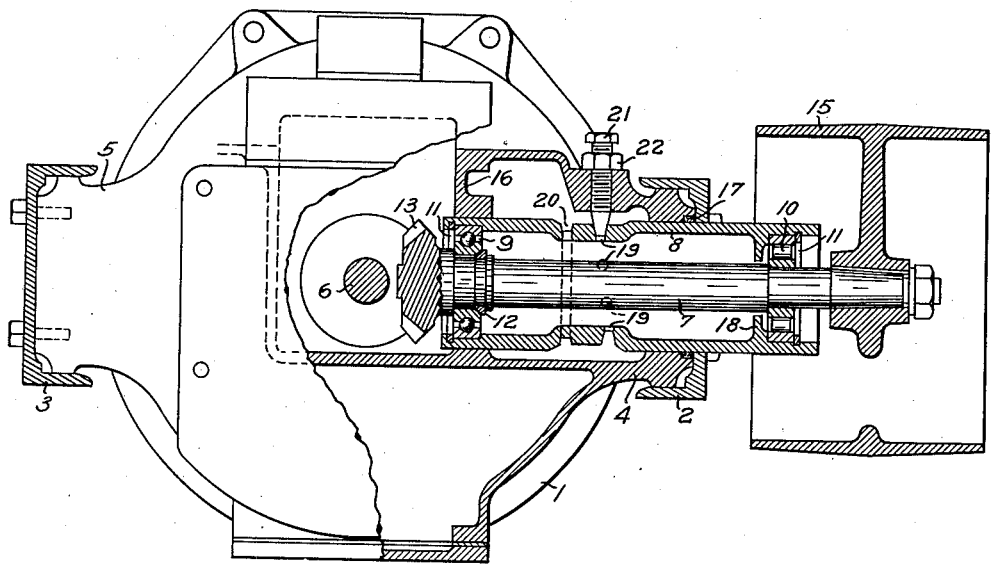
Figure 1 is a sectional view through the attachment and through a portion of the tractor.

The tractor to which the attachment is secured comprises a clutch housing 1 mounted between frame channels 2 and 3 by means of mounting lugs 4 and 5 and enclosing a power shaft 6 driven from the tractor engine. 7 indicates a belt pulley shaft which is rotatably mounted in a sleeve 8 by means of a ball bearing 9 seated in the sleeve 8 at one end thereof and by means of a roller bearing 10 seated in the sleeve 8 at the other end thereof. The outer race of the ball bearing 9 abuts against a shoulder of the sleeve 8 and is retained by a snap ring 11, and the outer race of the roller bearing 10 is similarly secured within the sleeve 8. The inner race of the ball bearing 9 is axially retained on the shaft 7 by a shoulder and a snap ring 12, and the shaft is thus prevented from axial displacement within the sleeve 8. A bevel gear 13 is integrally formed with the shaft 7 and meshes with a bevel gear 14 keyed to the power shaft 6, and a belt pulley 15 is secured to the outer end of the shaft 7 projecting from the sleeve 8. A suitable dust seal, not shown, may be mounted in the outer end of the sleeve 8 at the side of the roller bearing 10 facing the hub of the belt pulley 15. The inner end of the sleeve 8 is slidingly fitted into a bore of an internal web 16 of the clutch housing 1, the diameter of the bore corresponding within close limits to the outside diameter of the portion of the sleeve 8 seated in the bore. An intermediate portion of the sleeve 8 is slidingly fitted into a bore of the mounting lug 4 of the clutch housing 1, the channel 2 having an aperture registering with the bore in the lug 4. An oil seal 17, preferably in the form of a cork ring, is retained in a counter bore of the lug 4 by the web of channel 2, and an internal flange 18 projects inwardly from the sleeve 8, whereby lubricant into which the lower portion of the bevel gear 13 may be immersed, will be prevented from flowing out of the clutch housing. The outside diameter of the sleeve portion which is seated in the bore of the lug 4 is the same as the outside diameter of the sleeve portion seated in the web 16, and the bore of the lug 4 corresponds within close limits to said outside diameter. A portion of the sleeve intermediate the seats afforded by the bores in the web 16 and lug 4 is reduced in diameter and provided with a series of holes 19 and with an annular groove 20, the holes 19 being isolated from one another by circumferential portions of the sleeve extending therebetween and tapered to receive the tapered end of a set screw 21 which is screwed into a threaded hole of a wall portion of the clutch housing 1. The holes 19 are arranged on a helical line around the axis of sleeve 8 and are equally spaced from each other circumferentially of the sleeve, that is, if there are six holes in the sleeve, the holes will be angularly offset sixty degrees relative to each other. As to the relative spacing of the holes in the direction of the sleeve axis the showing of Figs. 1 and 2 is greatly exaggerated in order to make the helical character of the arrangement of the holes readily visible, but in actual construction the relative spacing of the holes in the direction of the sleeve axis is less than a small fraction of an inch, for instance, about five thousandths of an inch. Fig. 2 shows two of the holes 19 at opposite sides of the set screw 21, one of the holes being closer to the groove 20 and the other being farther from the groove than the center of the set screw 21.

By first loosening the lock nut 22 on the set screw and then screwing the set screw back the tapered end of the set screw may be withdrawn from the hole 19 in the sleeve in which it is shown in Fig. 1. The sleeve is then free to be rotated about its axis and also to be moved back or forth in the direction of its axis. For purposes of description it may be assumed that the sleeve is rotated in a direction so as to bring the hole 19 which in Fig. 2 is farthest from the groove 20, underneath the tapered end of the withdrawn set screw 21, a rotation of the sleeve through an angle of sixty degrees being necessary for this purpose where the angular spacing of the holes is sixty degrees as mentioned above. The set screw 21 may then be screwed down again and will enter the new hole 19 even if the center of the hole was not brought into perfect alinement with the center of the set screw, the tapered end of the set screw and the correspondingly tapered shape of the hole 19 taking care of such slight inaccuracy in rotating the sleeve 8 by hand into the new position. As the set screw 21 is screwed down and tightly wedged into the new hole 19 the sleeve is again positively fixed in position but the new position differs from the original one in that the sleeve has been moved in the direction of its axis a very short distance farther into the clutch housing 1, the relative axial spacing of the holes 19 being very short, as stated. It will be seen that due to the helical arrangement of the holes 19 about the axis of the sleeve 8 the sleeve may be moved in or out relative to the clutch housing in the described manner for very short but definite distances, and an inexpensive, simple and efficient way of regulating the depth of mesh of the bevel gears 13 and 14 without the use of shims is therefore provided. In order to find the proper axial position of the sleeve 8 in which the bevel gears 13 and 14 have their proper depth of mesh for best efficiency, which is indicated by the backlash of the pulley shaft 7, it is usually necessary to try different holes 19 when the belt pulley unit is mounted in the tractor for the first time. After the proper position has been found an arrow 23 (Fig. 2) is stamped on the sleeve 8 opposite to an arrow 24 on the frame channel 2, alinement of the arrows indicating the angular position of the sleeve in which the set screw 21 engages the hole 19 which has been found to afford the proper depth of mesh of the bevel gears. If it is desired to disengage the bevel gears 13 and 14 from each other so that the belt pulley may remain stationary while the power shaft 5 revolves, the set screw 21 is withdrawn from the tapered hole in which it is shown in Fig. 1, whereupon the sleeve 8 may be moved outwardly by pulling on the belt pulley 15 until the groove 20 registers with the withdrawn set screw 21. The sleeve and bevel gear 13 will then occupy the dash-dotted line position indicated in Fig. 2, and the sleeve will still be seated in the bore of the web 16, and by screwing the set screw down into the groove 20 the sleeve will be held in a position in which the bevel gears are out of mesh. In order to bring the bevel gears again in mesh with each other the operation is reversed, and by keeping the arrow 23 of the sleeve during this operation in alinement with the arrow 24 of the frame channel 2 the hole 19 which affords the correct depth of mesh may readily be registered with the set screw 21. Generally speaking, the relative spacing of the holes 19 in the direction of the axis of the sleeve 8 is a small fraction of the total depth of mesh of the bevel gears 13 and 14 while the spacing between the groove 20 and the hole 19 nearest thereto, in the direction of the sleeve axis, is larger than the total depth of mesh of the bevel gears. If desired, the sleeve 8 with the shaft 7 journaled therein, together with the bevel gear 13 and the belt pulley 15, may be entirely withdrawn from the clutch housing, the maximum diameter of the bevel gear 13 being somewhat shorter than the diameters of the bores in the web 16 and lug 4 so that the bevel gear 13 can pass therethrough. The opening in the channel 2 which registers with the bore in the lug 4 may then be closed by a suitable cover.

It should be understood that it is not intended to limit the invention to the exact details of construction herein shown and described, for various modifications within the scope of the claims may occur to persons skilled in the art.

It is claimed and desired to secure by Letters Patent:

1. In a motor vehicle, a housing, a rotary power shaft within said housing, a sleeve having a series of helically arranged tapered holes in it and being mounted in said housing for rotary and longitudinal sliding movement on an axis angularly disposed relative to the axis of said power shaft, a pulley shaft extending through said sleeve and rotatably mounted therein in axially fixed position, bevel gears secured to said power shaft and pulley shaft for transmitting rotary movement from said power shaft to said pulley shaft, and a set screw on said housing having a tapered end adapted to be wedged into any selected hole of said series for positively locking said sleeve in a plurality of axially adjusted positions affording slightly different depths of mesh of said bevel gears.

2. An adjustable mounting for bevel gears, comprising a support, a sleeve element mounted on said support for rotary and axial movement relative thereto and having more than two radial apertures therein offset against one another axially and circumferentially of said sleeve element, a shaft rotatably mounted in said sleeve element in axially fixed position relative thereto, a bevel gear secured to said shaft at one end of said sleeve element, and a locking element mounted on said support for adjustment radially of said sleeve element and having a tapered portion adapted to wedgingly engage any one of said radial apertures for positively securing said sleeve element against axial and rotary movement relative to said support, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear.

3. An adjustable mounting for bevel gears, comprising a support, a sleeve element mounted on said support for rotary and axial movement relative thereto and having more than two circular radially disposed apertures therein offset against one another axially and circumferentially of said sleeve element, a shaft rotatably mounted in said sleeve element in axially fixed position relative thereto, a bevel gear secured to said shaft at one end of said sleeve element, and a locking element mounted on said support for adjustment radially of said sleeve element and having a conical portion adapted to wedgingly engage any one of said radial apertures for positively securing said sleeve element against axial and rotary movement relative to said support, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear.

4. An adjustable mounting for bevel gears, comprising a support, a sleeve element mounted on said support for rotary and axial movement relative thereto and having more than two radially disposed apertures therein offset against one another axially and circumferentially of said sleeve element, each of said apertures being conical and tapering towards the axis of said sleeve element, a shaft rotatably mounted in said sleeve element in axially fixed position relative thereto, a bevel gear secured to said shaft at one end of said sleeve element, and a locking element mounted on said support for adjustment radially of said sleeve element and having a conical end portion adapted to wedgingly engage any one of said conical apertures for positively securing said sleeve element against axial and rotary movement relative to said support, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear.

5. An adjustable mounting for bevel gears, comprising a supporting member, a sleeve member mounted on said supporting member for rotary and axial movement relative thereto, one of said members having more than two apertures therein extending transversely to the axis of said sleeve member and being offset against one another axially and circumferentially of said sleeve member, a locking element mounted on the other of said members for adjustment radially of said sleeve member and having a tapered portion adapted to wedgingly engage any one of said apertures for positively securing said sleeve member against axial and rotary movement relative to said supporting member, a shaft rotatably mounted in said sleeve member in axially fixed position relative thereto, and a bevel gear secured to said shaft, the distance between parallel planes extending radially of said sleeve member through the centers of the two of said apertures which are farthest from each other axially of said sleeve member being equal to a total range of axial adjustment of said sleeve member desired for varying the depth of mesh of said bevel gear with a mating gear.

6. A belt pulley attachment for motor vehicles, comprising a sleeve element having more than two radial apertures therein offset against one another axially and circumferentially of said sleeve element, a shaft rotatably mounted in said sleeve element in axially fixed position relative thereto, and a bevel gear and a belt pulley secured to said shaft at opposite ends of said sleeve element, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear.

7. A belt pulley attachment for motor vehicles, comprising a sleeve element having more than two radial apertures therein progressively offset against one another axially and circumferentially of said sleeve element, a shaft rotatably mounted in said sleeve element in axially fixed position relative thereto, and a bevel gear and a belt pulley secured to said shaft at opposite ends of said sleeve element, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear.

8. A belt pulley attachment for motor vehicles, comprising a sleeve element having more than two radial apertures therein equally offset against one another axially of said sleeve element, and equally spaced from one another circumferentially of said sleeve element, said apertures being isolated from one another by circumferential portions of said sleeve element extending therebetween, a shaft rotatably mounted in said sleeve element in axially fixed position relative thereto, and a bevel gear and a belt pulley secured to said shaft at opposite ends of said sleeve element, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear.

9. A belt pulley attachment for motor vehicles, comprising a sleeve element having more than two radial apertures therein offset against one another axially and circumferentially of said sleeve element, a shaft rotatably mounted in said sleeve element in axially fixed position relative thereto, and a bevel gear and a belt pulley secured to said shaft at opposite ends of said sleeve element, the distance between parallel planes extending radially of said sleeve element through the centers of those of said apertures located respectively nearest to and farthest from said bevel gear being equal to a total range of axial adjustment of said sleeve element desired for varying the depth of mesh of said bevel gear with a mating gear, said sleeve element also having a circumferential groove therein between said bevel gear and said radial aperture nearest to the latter, and the distance between parallel planes extending radially of said sleeve element through the respective centers of said groove and nearest aperture being not less than the amount of axial adjustment of said sleeve element required to bring said bevel gear out of mesh with said mating gear.

CONRAD E. FRUDDEN.